(12) United States Patent
Chen et al.

(10) Patent No.: US 12,323,229 B2
(45) Date of Patent: Jun. 3, 2025

(54) DEVICE, APPARATUS, AND METHOD FOR ADJUSTING OPTICAL SIGNALS, AND STORAGE MEDIUM

(71) Applicant: ACCELINK TECHNOLOGIES CO., LTD., Wuhan (CN)

(72) Inventors: Zhi Chen, Wuhan (CN); Li Xiao, Wuhan (CN); Qinlian Bu, Wuhan (CN); Chunping Yu, Wuhan (CN); Weiqing Zhang, Wuhan (CN)

( * ) Notice: Subject to any disclaimer, the term of this patent is extended or adjusted under 35 U.S.C. 154(b) by 69 days.

(21) Appl. No.: 18/027,090

(22) PCT Filed: Dec. 8, 2020

(86) PCT No.: PCT/CN2020/134441
§ 371 (c)(1),
(2) Date: Mar. 17, 2023

(87) PCT Pub. No.: WO2022/062187
PCT Pub. Date: Mar. 31, 2022

(65) Prior Publication Data
US 2023/0336267 A1 Oct. 19, 2023

(30) Foreign Application Priority Data
Sep. 23, 2020 (CN) .......................... 202011009105.5

(51) Int. Cl.
*H04J 14/02* (2006.01)
(52) U.S. Cl.
CPC ................. *H04J 14/0221* (2013.01)
(58) Field of Classification Search
CPC .................................................. H04J 14/0221
(Continued)

(56) References Cited

U.S. PATENT DOCUMENTS

| | | | |
|---|---|---|---|
| 6,577,789 B1 * | 6/2003 | Wang | H04B 10/2941 359/341.1 |
| 7,813,654 B1 | 10/2010 | Ng et al. | |

(Continued)

FOREIGN PATENT DOCUMENTS

| | | | |
|---|---|---|---|
| CN | 101877572 A | * | 11/2010 |
| CN | 102857301 A | | 1/2013 |
| CN | 105068355 A | | 11/2015 |

OTHER PUBLICATIONS

International Search Report of PCT/CN2020/134441 filed Dec. 8, 2020.

(Continued)

*Primary Examiner* — Dalzid E Singh
(74) *Attorney, Agent, or Firm* — Chang & Hale LLP

(57) ABSTRACT

An optical signal adjusting apparatus, device and method, and storage medium. The optical signal adjusting apparatus (1) includes a differential operation circuit (11), a feedforward amplification circuit (12) and a control circuit (13), wherein input ends of control circuit (13) are respectively connected to an output end of the differential operation circuit (11) and an output end of the feedforward amplification circuit (12); the differential operation circuit (11) is configured to perform a differential operation on an input optical signal and an output optical signal, to obtain a differential value; the feedforward amplification circuit (12) is configured to perform feedforward amplification on the input optical signal, to obtain a feedforward value; and the control circuit (13) is configured to receive the differential value and the feedforward value, and adjusts the output optical signal according to the differential value and the feedforward value, to obtain an adjusted output optical signal.

15 Claims, 3 Drawing Sheets

(58) Field of Classification Search
USPC .......................................................... 398/79
See application file for complete search history.

(56) References Cited

U.S. PATENT DOCUMENTS

| | | | | |
|---|---|---|---|---|
| 2002/0044336 A1* | 4/2002 | Tanaka | ............... | H04B 10/0731 |
| | | | | 359/334 |
| 2002/0114066 A1* | 8/2002 | Nakaji | ................ | H01S 3/06754 |
| | | | | 359/341.41 |
| 2003/0067670 A1* | 4/2003 | Pavel | .................. | H01S 3/06758 |
| | | | | 359/337 |
| 2004/0021932 A1* | 2/2004 | Maurer | ............... | H01S 3/06754 |
| | | | | 359/341.41 |
| 2004/0051938 A1 | 3/2004 | Chan et al. | | |
| 2004/0114215 A1* | 6/2004 | Tian | ................... | H04B 10/2931 |
| | | | | 359/341.41 |

OTHER PUBLICATIONS

Search Report of Chinese Priority Application CN202011009105.5 filed Sep. 23, 2020.

* cited by examiner

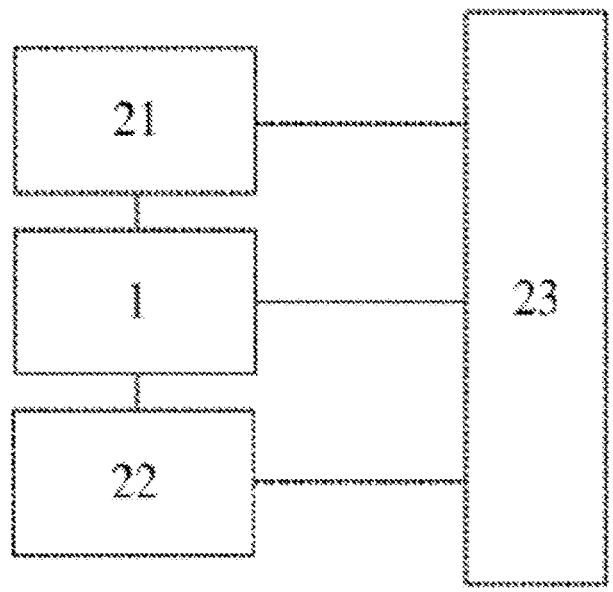

Fig. 5

| Perform, by a differential operation circuit, a differential operation on an input optical signal and an output optical signal corresponding to the input optical signal to obtain a differential value | S101 |

| Perform a feedforward amplification on the input optical signal by a feedforward amplification circuit to obtain a feedforward value | S102 |

| Adjust the output optical signal according to the differential value and the feedforward value to obtain an adjusted output optical signal | S103 |

Fig. 6

DEVICE, APPARATUS, AND METHOD FOR ADJUSTING OPTICAL SIGNALS, AND STORAGE MEDIUM

CROSS-REFERENCE

The present disclosure claims a benefit of, and priority to Chinese Patent Application No. 202011009105.5 filed on Sep. 23, 2020, titled "Device and Method for adjusting optical signals, and Storage Medium", the disclosure of which is hereby expressly incorporated by reference in its entirety.

TECHNICAL FIELD OF THE DISCLOSURE

The invention relates to the field of optical communication technologies, in particular to a device, apparatus, and method for adjusting optical signals, and a storage medium.

BACKGROUND

In recent years, in the field of optical communication, especially in Dense Wavelength Division Multiplexing (DWDM) optical transmission, in order to increase the distance of optical transmission, an Erbium-doped Optical Fiber Amplifier (EDFA) functions as a key device of DWDM optical transmission, and it directly affects the key performance of DWDM optical transmission.

In related technologies, a device for adjusting optical signals samples an input optical signal and an output optical signal, and calculates a difference between the input optical signal and the output optical signal, so as to drive a pump laser according to the difference, and adjust the output detection power output by the device for adjusting optical signals. Since it is necessary to calculate the difference between the input optical signal and the output optical signal first before the device for adjusting optical signals adjusts the output detecting power output by the device for adjusting optical signals, thus the speed of the device for adjusting optical signals is reduced when adjusting the optical signals.

SUMMARY

In order to solve the above technical problems, embodiments of the present disclosure are proposed to provide a device, apparatus, and method for adjusting an optical signal, and a storage medium, all of which can improve the speed at which the device for adjusting optical signals adjusts the optical signal.

The technical solutions of the present disclosure are realized as follows.

The present disclosure provides a device for adjusting optical signals, which comprises a differential operation circuit, a feedforward amplification circuit and a control circuit, wherein input ends of the control circuit are respectively connected with an output end of the differential operation circuit and an output end of the feedforward amplification circuit;

wherein the differential operation circuit is configured to perform a differential operation on an input optical signal and an output optical signal to obtain a differential value;

the feedforward amplification circuit is configured to perform a feedforward amplification on the input optical signal to obtain a feedforward value; and the control circuit is configured to receive the differential value and the feedforward value, and adjust the output optical signal according to the differential value and the feedforward value to obtain an adjusted output optical signal.

The present disclosure provides an apparatus for adjusting optical signals, which comprises a light source device, a spectral analysis device, a control device, and the device for adjusting optical signals described above;

wherein the control device is connected with the light source device and the spectral analysis device respectively; an output end of the light source device is connected with an input end of the device for adjusting optical signals; and an output end of the device for adjusting optical signals is connected with an input end of the spectral analysis device;

wherein the light source device is configured to receive original parameters sent by the control device and an input power parameter corresponding to an optical signal amplification factor, generate a light source signal corresponding to the input power parameter, and send the light source signal to the device for adjusting optical signals, wherein the original parameters and the input power parameter are parameters of the device for adjusting optical signals;

the spectral analysis device is configured to receive an optical signal output by the device for adjusting optical signals, and detect power of the optical signal to obtain first power; and the control device is configured to receive the original parameters and the input power parameter; receive the first power; in a case that the first power meets a preset condition, take the original parameters as configuration parameters; and in a case that the first power does not meet the preset condition, adjust the original parameters until second power corresponding to adjusted original parameters meets the preset condition, and take the adjusted original parameters as the configuration parameters to enable the device for adjusting optical signals to use the configuration parameters to configure the input power detecting circuit, the feedforward amplification circuit and the noise compensation circuit.

An embodiment of the present disclosure provide a method for adjusting optical signals, which is applied to a device for adjusting an optical signal, wherein the device for adjusting optical signals comprises a differential operation circuit, a feedforward amplification circuit and a control circuit, wherein input ends of the control circuit are connected with an output end of the differential operation circuit and an output end of the feedforward amplification circuit respectively, wherein the method comprises:

performing, by the differential operation circuit, a differential operation on an input optical signal and an output optical signal corresponding to the input optical signal to obtain a differential value;

performing, by the feedforward amplification circuit, a feedforward amplification on the input optical signal to obtain a feedforward value;

adjusting the output optical signal according to the differential value and the feedforward value to obtain an adjusted output optical signal.

An embodiment of the present disclosure provides a storage medium on which a computer program is stored and applied to a device for adjusting an optical signal, wherein the computer program, when executed by a processor, implements the method described in any of the above embodiments.

The embodiments of the present disclosure provide a device, apparatus and method for adjusting an optical signal, and a storage medium. The device for adjusting optical signals comprises a differential operation circuit, a feedforward amplification circuit, and a control circuit, wherein input ends of the control circuit are connected with an output end of the differential operation circuit and an output end of the feedforward amplification circuit respectively; the differential operation circuit is configured to perform a differential operation on an input optical signal and an output optical signal to obtain a differential value; the feedforward amplification circuit is configured to perform a feedforward amplification on the input optical signal to obtain a feedforward value; and the control circuit is configured to receive the differential value and the feedforward value, and adjust the output optical signal according to the differential value and feedforward value to obtain an adjusted output optical signal. According to the implementation scheme of the device for adjusting optical signals described above, when the device for adjusting optical signals obtains the input optical signal and the output optical signal corresponding to the input optical signal, the device for adjusting optical signals can directly use the differential operation circuit and the feedforward amplification circuit to respectively obtain the differential value and the feedforward value, without having to calculate the differential value between the input optical signal and the output optical signal separately, whereby the speed at which the device for adjusting optical signals calculates the differential value between the input optical signal and the output optical signal and the feedforward value is increased, increasing the speed at which the device for adjusting optical signals adjusts the output optical signal.

BRIEF DESCRIPTION OF THE DRAWINGS

FIG. 5 is a schematic diagram I of the connection of a device for adjusting optical signals provided by an embodiment of the present disclosure;

FIG. 6 is a flow chart I of a method for adjusting optical signals provided by an embodiment of the present disclosure.

DETAILED DESCRIPTION

In order to thoroughly understand the features and the technical contents of the embodiments of the present disclosure, the implementation of the embodiments of the present disclosure will be described in detail below in combination with the attached drawings. However, the attached drawings are for reference only and are not intended to limit the embodiments of the present disclosure.

In the prior art, the EDFA control technology has gone through the following stages: a pumping constant current control mode, which is simple to control, however, when the input optical signal of the EDFA appears in the upper and lower channels, the output residual signal of the EDFA will suddenly increase or decrease, affecting the transmission quality; an output constant power control mode, which can ensure the constant output power no matter how the input optical power of the EDFA changes, however, the output constant power control mode is the same as the pumping constant current control mode that when the input optical signal of the EDFA appears in the upper and lower channels, the output residual signal of the EDFA will suddenly increase or decrease, affecting the transmission quality; an EDFA feedforward control mode, which directly controls the pump through a linear formula of the input signal to achieve the automatic gain control, and has the disadvantage of low gain control accuracy, while in the case of pump aging, the gain will also decline.

For the problems existing in the prior art, they can be specifically solved by the methods in the following embodiments.

Embodiment 1

Figure 1:
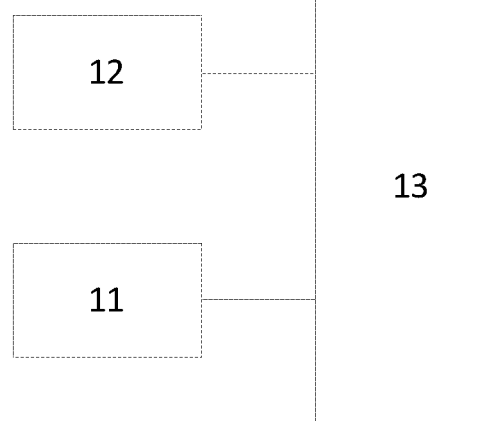
FIG. 1 is a schematic diagram I of the connection of a device for adjusting optical signals provided by an embodiment of the present disclosure.

An embodiment of the present disclosure provides a device 1 for adjusting optical signals. As shown in FIG. 1, the device for adjusting optical signals comprises:
 a differential operation circuit 11, a feedforward amplification circuit 12 and a control circuit 13, wherein input ends of the control circuit 13 are respectively connected with an output end of the differential operation circuit 11 and an output end of the feedforward amplification circuit 12;
 the differential operation circuit 11 is configured to perform a differential operation on the input optical signal and the output optical signal to obtain a differential value;
 the feedforward amplification circuit 12 is configured to perform a feedforward amplification on the input optical signal to obtain a feedforward value; and
 the control circuit 13 is configured to receive the differential value and the feedforward value, and adjust the output optical signal according to the differential value and the feedforward value so as to obtain an adjusted output optical signal.

The device for adjusting an optical signal provided by the embodiment of the present disclosure is applicable to a scenario of amplifying the received input optical signals.

In an embodiment of the present disclosure, the input optical signal received by the differential operation circuit may be a voltage value of the input optical signal, a current value of the input optical signal, a power value of the input optical signal, and it may also be an input optical signal expressed in other forms, which may be specifically determined according to the actual situations and not particularly limited in the embodiments of the present disclosure.

In an embodiment of the present disclosure, the feedforward amplification circuit comprises a feedforward parameter, and the feedforward amplification circuit may obtain the feedforward value according to a product of the feedforward parameter and the input optical signal after it receives the input optical signal.

It should be noted that the device for adjusting optical signals comprises a configuration register, and the feedforward parameter may be configuration parameters obtained by the control circuit from the configuration register.

It should also be noted that the feedforward parameter may be written into the configuration register by the device for adjusting optical signals before the feedforward amplification circuit receives the input optical signal.

In an embodiment of the present disclosure, the mode of adjusting the output optical signal by the control circuit according to the differential value and the feedforward value may be that the control circuit determines a sum of the differential value and the feedforward value, and adjusts the output optical signal according to the sum of the differential value and the feedforward value, so as to obtain an adjusted output optical signal.

In an embodiment of the present disclosure, the differential operation circuit further comprises an analog-to-digital converter (ADC). The differential operation circuit performs a differential operation on the input optical signal and the output optical signal to obtain the differential value, then the differential operation circuit uses the ADC to convert the differential value into a differential value in a form of digital signal, and transmits the converted differential value to the control circuit.

In an embodiment of the present disclosure, the feedforward amplification circuit comprises an ADC too. The feedforward amplification circuit performs a feedforward amplification on the input optical signal to obtain the feedforward value, then the feedforward amplification circuit uses the ADC to convert the feedforward value into a feedforward value in a form of digital signal, and transmits the converted feedforward value to the control circuit.

Figure 2:
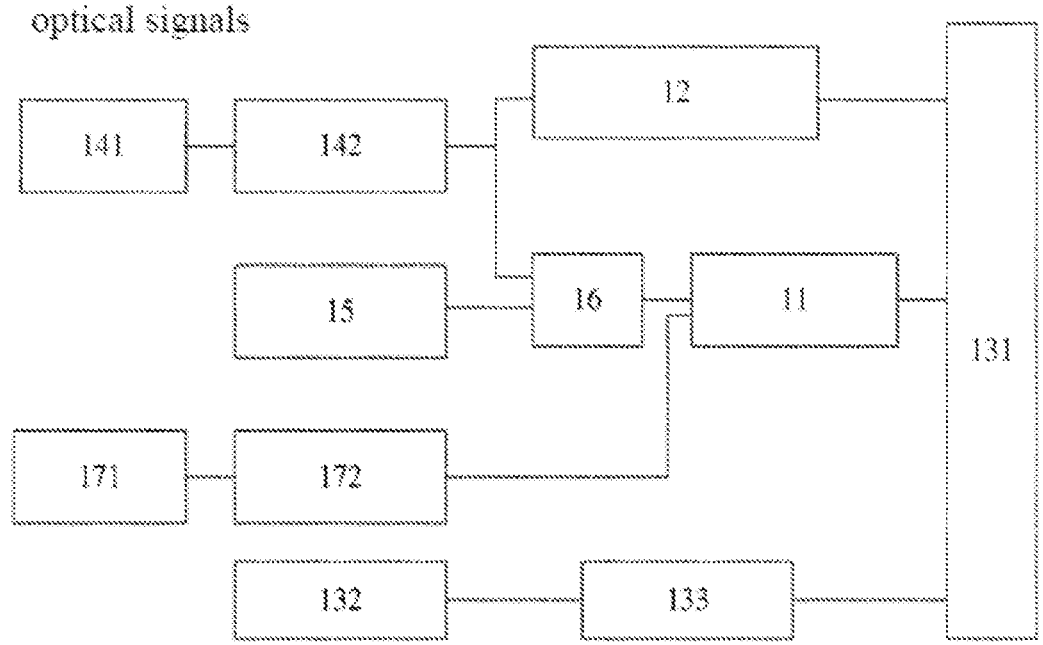
FIG. 2 is a schematic diagram II of the structure of a device for adjusting optical signals provided by an embodiment of the present disclosure.

Optionally, as shown in FIG. 2, the device for adjusting optical signals further comprises an optical signal input circuit 14, which in turn comprises an optical signal input port 141 and an input power detecting circuit 142; and an input end of the input power detecting circuit 142 is connected with the optical signal input port 141, and an output end of the input power detecting circuit 142 are connected with an input end of the feedforward amplification circuit 12 and the output end of the differential operation circuit 11 respectively.

The input power detecting circuit 142 is configured to receive an original input optical signal using the optical signal input port 141, amplify the original input optical signal according to an input resistance value so as to obtain the input optical signal, and transmit the input optical signal to the feedforward amplification circuit 12 and the differential operation circuit 11.

In an embodiment of the present disclosure, an output end of the optical signal input circuit is connected with the input end of the feedforward amplification circuit and the output end of the differential operation circuit respectively.

In an embodiment of the present disclosure, the optical signal input port may be a port of the device for adjusting optical signals to receive the optical signal.

For example, the optical signal input port is provided with a photodiode, by which the device for adjusting optical signals may receive the input optical signal. The device for adjusting optical signals may also use other methods to receive the input optical signal, which may be specifically determined according to the actual situations and is not particularly limited in the embodiments of the present disclosure.

In an embodiment of the present disclosure, the device for adjusting optical signals may be connected with a light source device, and use the photodiode of the optical signal input port to receive the original input optical signal from an output end of the light source device.

It should be noted that an optical signal amplification factor may be written into the configuration register by the device for adjusting optical signals before the input power detecting circuit receives the input optical signal.

Optionally, as shown in FIG. 2, the feedforward amplification circuit 12 is configured to amplify the input optical signal using the configured feedforward parameter, so as to obtain the feedforward value.

In an embodiment of the present disclosure, the feedforward parameter specifically comprises a first parameter K and a second parameter B, and the feed forward amplification circuit may calculate K times of the input optical and then adds B after it obtains the input optical signal, thereby getting the feed forward value.

It should be noted that the first parameter K may be a slope of the feedforward parameter, and the second parameter B may be an intercept of the feedforward parameter.

In an embodiment of the present disclosure, the configuration register is provided with configured initial values comprising an initial value of the gain correction factor, an initial value of the feedforward parameter, and an initial value of the noise parameter, wherein the initial value of the feedforward parameter comprises an initial K value and an initial B value.

It should be noted that the initial value of the gain correction factor may be 100; the initial K value may be 0; the initial B value may be 0; and the initial value of the noise parameter may be 0.

In an embodiment of the present disclosure, the device for adjusting optical signals obtains the gain correction factor, the feedforward parameter and the noise parameter by debugging the initial value of the gain correction factor, the initial value of the feedforward parameter and the initial value of the noise parameter.

Optionally, as shown in FIG. 2, the device for adjusting optical signals further comprises a noise compensation circuit 15 and an adder 16;

an output end of the noise compensation circuit 15 and the output end of the input power detecting circuit 142 are respectively connected with an input end of the adder 16; and an output end of the adder 16 is connected with an input end of the differential operation circuit 11;

the noise compensation circuit 15 is configured to generate a noise signal corresponding to the configured noise parameter; and the adder 16 is configured to receive the noise signal, and fuse the noise signal with the input optical signal to obtain the fused input optical signal.

In the embodiments of the present disclosure, the noise compensation circuit may be an amplified spontaneous emission (ASE) compensation circuit or a circuit with ASE compensation function, and it may be specifically determined according to the actual situations, while the embodiments of the present disclosure will not pose any limitation herein.

In an embodiment of the present disclosure, the power of the input light source device is adjusted to the lower limit value of the input power parameter of the device for adjusting optical signals under a preset gain. The output end of the light source device is connected with an input end of the device for adjusting optical signals. The noise parameter is adjusted so that the power of the output signal of the device for adjusting optical signals detected by an OSA spectral analysis device is equal to a sum of the lower limit of the input power parameter and the preset gain, and thus the device for adjusting optical signals obtains the noise parameter.

Optionally, as shown in FIG. 2, the differential operation circuit 11 is configured to receive the fused input optical signal, and perform a differential operation on the fused input optical signal and the output optical signal to obtain the differential value.

Optionally, as shown in FIG. 2, the device for adjusting optical signals further comprises an optical signal output circuit 17 which comprises an optical signal output port 171 and an output power detecting circuit 172;

an input end of the output power detecting circuit 172 is connected with the optical signal output port 171, and an output end of the output power detecting circuit 172 is connected with the input end of the differential operation circuit 11;

the output power detecting circuit 172 is configured to obtain the output optical signal through the optical signal output port 171, and transmit the output optical signal to the differential operation circuit 11.

In an embodiment of the present disclosure, the optical signal output port may be a port where the device for adjusting optical signals outputs the optical signal.

In an embodiment of the present disclosure, the output power detecting circuit may calculate a voltage value of the output optical signal, a power value of the output optical signal, a current value of the output optical signal, and other parameter values of the output optical signal, which may be specifically determined according to the actual situations and the embodiments of the present disclosure will not pose any limitation herein.

In an embodiment of the present disclosure, after the output power detecting circuit calculates the voltage value, the power value, the current value or the parameter value of the output optical signal, it may transmit the output optical signal to the differential operation circuit in the form of the voltage value, the power value, the current value or the parameter value.

For example, the optical signal output port is provided with a photodiode, by which the device for adjusting optical signals may obtain the output optical signal. The device for adjusting optical signals can also use other methods to obtain the output optical signal, which may be specifically determined according to the actual situations while the embodiments of the present disclosure will not pose any limitation herein.

Optionally, as shown in FIG. 2, the control circuit 13 comprises a controller 131 which is configured to adjust the differential value to obtain the adjusted differential value, and determine a sum of the adjusted differential value and the feedforward value to obtain the adjusted value of the output optical signal.

Input ends of the controller 131 are respectively connected with the output end of the differential operation circuit 11 and the output end of the feedforward amplification circuit 12;

In an embodiment of the present disclosure, the mode that the device for adjusting optical signals adjusts the differential value by using the controller is that the controller performs a proportional integral differential (PID) operation on the differential value to obtain the adjusted differential value. The controller can also use other modes to adjust the differential value to obtain the adjusted differential value. The specific methods may be specifically determined according to the actual situations, and the embodiments of the present disclosure will not pose any limitation herein.

Optionally, as shown in FIG. 2, the control circuit 13 further comprises a pump circuit 132 and a drive circuit 133;

an output end of the controller 131 is connected with an input end of the drive circuit 133; an output end of the drive circuit 133 is connected with an input end of the pump circuit 132; and an output end of the pump circuit 132 is connected with an output end of the optical signal output circuit 17;

the drive circuit 133 is configured to convert the adjusted value of the output optical signal into a voltage signal; and the pump circuit 132 is configured to receive the voltage signal, output an optical signal matched with the voltage signal, and fuse the optical signal and the output optical signal to obtain the adjusted output optical signal.

In an embodiment of the present disclosure, the output end of the pump circuit is specifically connected with the optical signal output port of the optical signal output circuit.

In an embodiment of the present disclosure, the pump circuit may be a circuit including a pump laser, which can generate pump light.

In an embodiment of the present disclosure, the drive circuit may be a circuit including a pump circuit, and the drive circuit can drive the pump circuit to generate pump light.

In an embodiment of the present disclosure, the controller is connected with the drive circuit through a digital to analog converter (DAC).

It should be noted that the digital-to-analog converter may be an electronic device capable of converting digital signals into analog signals, or a device capable of converting digital signals into analog signals, which may be specifically determined according to the actual situations, and the embodiments of the present disclosure does not pose any limitation herein.

Figure 3:
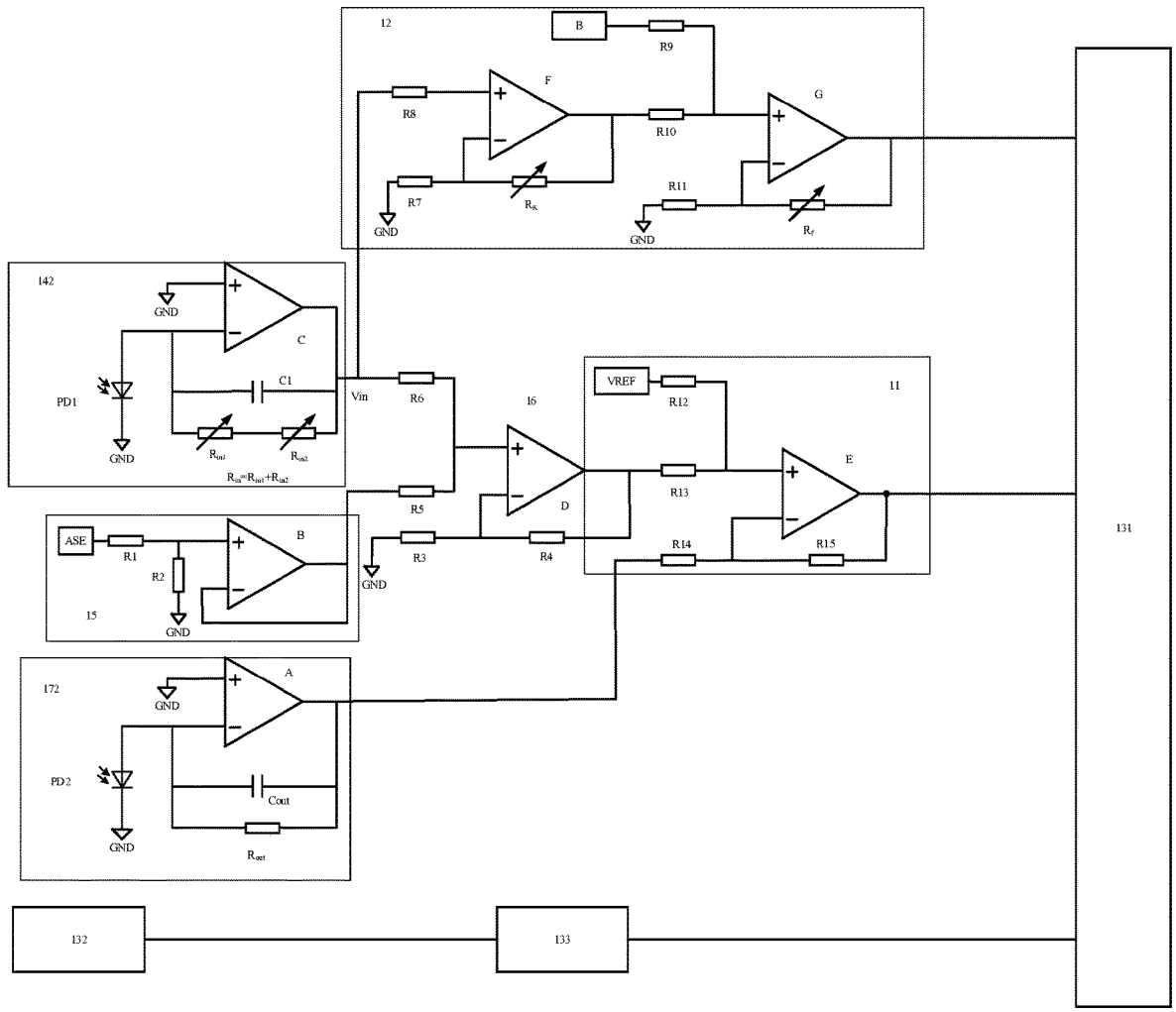
FIG. 3 is a schematic diagram I of the connection of an exemplary device for adjusting optical signals provided by an embodiment of the present disclosure.

For example, as shown in FIG. 3, the input ends of the controller are respectively connected with the output end of the differential operation circuit 11 and the output end of the feedforward amplification circuit 12; the output end of the controller 131 is connected with the input end of the drive circuit 133, and the output end of the drive circuit 133 is connected with the input end of the pump circuit 132. The output end of the input power detecting circuit 142 is respectively connected with the input end of the feedforward amplification circuit 12 and the input end of the adder 16; the output end of the noise compensation circuit 15 is connected with the input end of the adder 16; the input ends of the differential operation circuit 11 are respectively connected with the output end of the adder 16 and the output end of the output power detecting circuit 172. Specifically, the input end of the differential operation circuit 11 is connected with a resistor R13, a reference voltage VREF of the differential operation circuit 11 is connected in series with a resistor R12, and then connected in parallel with the resistor R13 to the forward input end of the operational amplifier E of the differential operation circuit 11; a reverse input end of operational amplifier E is connected with the output end of output power detecting circuit 172 through a resistor R14; two ends of a resistor R15 are respectively connected with the output end of the operational amplifier E and the reverse input end of the operational amplifier E, and the output end of the operational amplifier E is connected with controller 131. An output end of an operational amplifier D in the adder 16 is connected with the forward input end of the operational amplifier D through resistor R13; the forward input ends of the operational amplifier D are respectively connected with the output end of the input power detecting circuit 142 and the input end of the feedforward amplification circuit 12 through a resistor R6, and the forward input end of the operational amplifier D is also connected with the output end of the noise compensation circuit 15 through a resistor R5; the reverse input end of the operational amplifier D is grounded through a resistor R3, and the reverse input end of the operational amplifier D is connected with the output end of adder 16 through a resistor R4. The input end of the noise compensation circuit 15 is provided with the noise parameter ASE, which is connected with a forward input end of an operational amplifier B of the noise compensation circuit 15 through a resistor R1; the forward input end of the operational amplifier B is also grounded through a resistor R2; a reverse input end of the operational amplifier B is connected with an output end of the operational amplifier B, and the output end of the operational amplifier B is connected with the adder 16 through the resistor R5. A forward input end of the operational amplifier A in the output power detecting circuit 172 is grounded; a reverse input end of the operational amplifier A is grounded through a photodiode PD2; an output resistor Rout in the output power detecting circuit 172 is connected in parallel with a capacitance Cout in the output power detecting circuit 172, wherein the first end in parallel is connected to the reverse input end of the operational amplifier A; the second end in parallel is connected with an output end of the operational amplifier A; the output end of the operational amplifier A is connected with the differential operational circuit 11 through a resistor R14. The variable resistors Rin1 and Rin2 of the input power detecting circuit 142 are connected in series and then connected in parallel with a capacitor C1, the parallelly connected first end is connected with a reverse input end of an operational amplifier C in the input power detecting circuit 142, and the second parallelly connected end is connected with an output end of the operational amplifier C; the reverse input end of the operational amplifier C is also grounded through a photodiode PD1; a forward input end of the operational amplifier C is grounded; the output end of the operational amplifier C is connected with the adder 16 through a resistor R6. A forward input end of an operational amplifier F of the feedforward amplification circuit 12 is connected with the output end of the input power detecting circuit 142 through a resistor R8; a reverse input end of the operational amplifier F is grounded through a resistor R7; the reverse input end of the operational amplifier F is connected with an output end of the operational amplifier F through a variable resistor Rk; the output end of the operational amplifier F is connected with a forward input end of an operational amplifier G of the feedforward amplification circuit 12 through a resistor R10; a forward input end of the operational amplifier G is connected with a configuration parameter B through a resistor R9, a reverse input end of the operational amplifier G is grounded through a resistor R11, and the reverse input end of the operational amplifier G is also connected with an output end of the operational amplifier G through a variable resistor Rf; and the output end of the operational amplifier G is connected with the controller 131.

It should be understood that when the device for adjusting optical signals obtains the input optical signal and the output optical signal corresponding to the input optical signal, it can directly use the differential operation circuit and the feedforward amplification circuit to obtain the differential value and the feedforward value, and there is no need to calculate the differential value between the input optical signal and the output optical signal separately, thus the speed at which the device for adjusting optical signals calculates the differential value between the input optical signal and the output optical signal is increased, thereby increasing the speed at which the optical signal adjusting apparatus adjusts the output optical signal.

Embodiment 2

The embodiment of the present disclosure provides an apparatus 2 for adjusting optical signals, as shown in FIG. 5, which comprises:
  a light source device 21, a spectral analysis device 22, a control device 23, and the device 1 for adjusting optical signals described in Embodiment 1;
  wherein the control device 23 is connected with the light source device 21 and the spectral analysis device 22 respectively; an output end of the light source device 21 is connected with the input end of the device 1 for adjusting optical signals; the output end of the device 1 for adjusting optical signals is connected with an input end of the spectral analysis device 22;
  wherein the light source device 21 is configured to receive original parameters sent by the control device 23 and the input power parameter corresponding to an optical signal amplification factor, generate a light source signal corresponding to the input power parameter, and send the light source signal to the device 1 for adjusting optical signals, wherein the original parameters and the input power parameter are parameters in the device 1 for adjusting optical signals;
  the spectral analysis device 22 is configured to receive the optical signal output by the device 1 for adjusting optical signals, and detect power of the processed optical signal to obtain first power; and
  the control device 23 is configured to receive the original parameters and the input power parameter; receive the first power; in a case where the first power meets a preset condition, take the original parameters as the configuration parameters; while in a case where the first power does not meet the preset condition, adjust the original parameters until second power corresponding to the adjusted original parameters meets the preset condition, take the adjusted original parameters as the configuration parameters for the device 1 for adjusting optical signals to use the configuration parameters to configure the input power detecting circuit, the feedforward amplification circuit and the noise compensation circuit.

In an embodiment of the present disclosure, the input power parameter comprises a lower limit value of the input power parameter and an upper limit value of the input power parameter.

Optionally, the original parameters comprise an original gain correction factor, an original feedforward parameter and an original noise parameter; and
  the configuration parameters comprise a gain correction factor, a feedforward parameter and a noise parameter.

Optionally, the control device 23 is configured to receive a preset splitting ratio and preset output resistance values in the device 1 for adjusting optical signals; determine an input resistance value of the device 1 for adjusting optical signals according to the gain correction factor, the preset spectral ratio, the preset output resistance value and the optical signal amplification factor; and transmit the input resistance value to the device 1 for adjusting optical signals.

In an embodiment of the present disclosure, the gain correction factor may be $Factor_{Gain}$; the preset spectral ratio comprises an input spectral ratio $Tap_{in}$ and an output spectral ratio $Tap_{out}$; the preset output resistance value may be Rout, and the optical signal amplification factor may be Gain, then the input resistance value $R_{in}$ may be determined according to formula (1):

$$R_{in} = 10^{\frac{Gain}{10}} \times \frac{Tap_{out}}{Tap_{in}} \times \frac{Factor_{Gain}}{100} \times R_{out} \qquad (1)$$

In an embodiment of the present disclosure, the apparatus for adjusting optical signals debugs an initial value of the gain correction factor, an initial value of the feedforward parameter and an initial value of the noise parameter respectively, as shown below:
1. the control device obtains the initial value of the gain correction factor, the initial K value, the initial B value and the initial value of the noise parameter.
2. the device for adjusting optical signals sets P/I/D parameters for feed backing the proportional integral differential (PID) as initial values.

In an embodiment of the present disclosure, the device for adjusting optical signals enables the PID function after setting the P/I/D parameters in the PID as initial values.
3. the control device adjusts the output power of the light source device to the upper limit value of the input power parameter of the device for adjusting optical signals under a preset gain.

It should be noted that the preset gain is the optical signal amplification factor.

In an embodiment of the present disclosure, the light source device may be a multi-wave light source device.
4. the control device adjusts the gain correction factor, so that the OSA spectral analysis device could detect that the output signal power of the device for adjusting optical signals is equal to the sum of the preset gain and the upper limit value of the input power parameter.
5. the control device adjusts the input power of the light source device to the lower limit value of the input power parameter of the device for adjusting optical signals under the preset gain.

In an embodiment of the present disclosure, the output end of the light source device is connected with the input end of the device for adjusting optical signals.
6. the control device adjusts the noise parameter so that the power of the output signal of the device for adjusting optical signals detected by the OSA spectral analysis device is equal to the sum of the lower limit of the input power parameter and the preset gain.

In an embodiment of the present disclosure, the device for adjusting optical signals adjusts the noise parameter, enabling the power of the output signal of the device for adjusting optical signals detected by the OSA spectral analysis device to be equal to the sum of the lower limit value of the input power parameter and the preset gain, and then turns off the PID function.
7. the control device adjusts the input power of the light source device to the upper limit value of the input power parameter of the device for adjusting optical signals under the preset gain.

In an embodiment of the present disclosure, the output end of the light source device is connected with the input end of the device for adjusting optical signals.
8. the control device adjusts the initial K value in the feedforward parameters so that the output signal power of the device for adjusting optical signals to be measured detected by the OSA spectral analysis device is equal to the sum of the upper limit value of the input power parameter and the preset gain.
9. the control device adjusts the input power of the light source device to the lower limit value of the input power parameter of the device for adjusting optical signals under the preset gain.

In an embodiment of the present disclosure, the output end of the light source device is connected with the input end of the device for adjusting optical signals.
10. the control device adjusts the initial B value in the feedforward parameters so that the output signal power of the device for adjusting optical signals detected by the OSA spectral analysis device is equal to the sum of the lower limit of the input power parameter and the preset gain.
11. the control device adjusts the input power of the light source device to the upper limit value of the input power parameter of the device for adjusting optical signals under the preset gain.
12. when the OSA spectral analysis device detects that the output power of the device for adjusting optical signals approximates the sum of the lower limit of the input power parameter and the preset gain, the control device finishes debugging. Otherwise, the K and B values are readjusted until the OSA spectral analysis device detects that the output power of the optical signal adjusting apparatus approximates the sum of the lower limit of the input power parameter and the preset gain.
13. the control device writes the gain correction factor, the feedforward parameters and the noise parameter into the configuration register.

Figure 4:
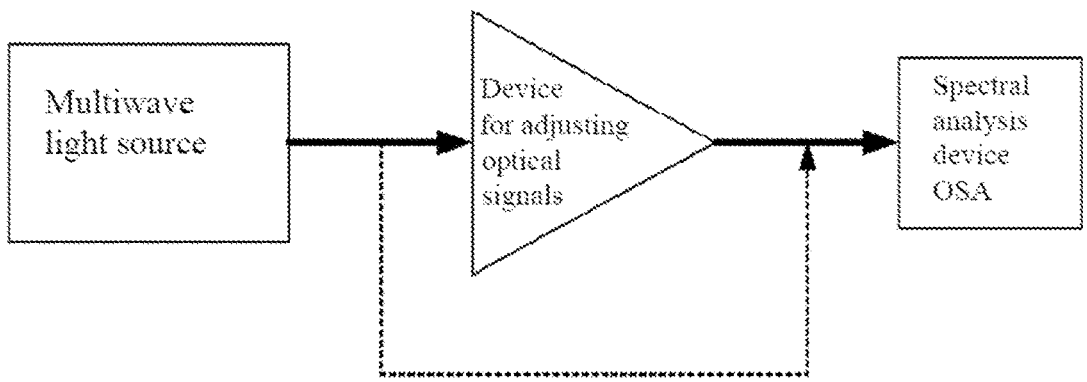
FIG. 4 is a schematic diagram II of the connection of an exemplary device for adjusting optical signals provided by an embodiment of the present disclosure.

In an embodiment of the present disclosure, the OSA spectral analysis device, the light source device and the device for adjusting optical signals are connected in a manner shown in FIG. 4. The light source device outputs the original input optical signal, and the device for adjusting optical signals receives the original input optical signal and transmits the output optical signal to the OSA spectral analysis device.

It should be understood that the apparatus for adjusting optical signals obtains the configuration parameters by adjusting the original parameters in the device for adjusting optical signals, so that the device for adjusting optical signals can obtain the input resistance value of the device for adjusting optical signals according to the configuration parameters, so as to according to the input resistance value, amplify the input optical signal under the amplification factor of the input optical signal, whereby the accuracy of the device for adjusting optical signals when amplifying the input optical signal is improved.

Embodiment 3

An embodiment of the present disclosure provides a method for adjusting optical signals, which is applied to a device for adjusting an optical signal. As shown in FIG. 6, the method comprises:
S101: performing, by a differential operation circuit, a differential operation on an input optical signal and an output optical signal corresponding to the input optical signal to obtain a differential value.

The device for adjusting optical signals provided by an embodiment of the present disclosure is applicable to a scenario of amplifying the received input optical signal.

In an embodiment of the present disclosure, the device for adjusting optical signals comprises a differential operation circuit, a feedforward amplification circuit, a control circuit, an optical signal input circuit and an optical signal output circuit, wherein input ends of the control circuit are respectively connected with an output end of the differential operation circuit and an output end of the feedforward amplification circuit; an output end of the control circuit is connected with an output end of the optical signal output circuit; an output end of the optical signal input circuit is respectively connected with an input end of the differential operation circuit and an input end of the feedforward amplification circuit; the output end of the optical signal output circuit is connected with an input end of the differential operation circuit.

In an embodiment of the present disclosure, the input optical signal received by the differential operation circuit may be a voltage value of the input optical signal, a current value of the input optical signal, a power value of the input optical signal, an input optical signal expressed in other forms, and it may be specifically determined according to the actual situations, while the embodiment of the present disclosure will not pose any limitation.

In an embodiment of the present disclosure, the device for adjusting optical signals uses the differential operation circuit to perform a differential operation on the input optical signal and the output optical signal corresponding to the input optical signal, and before the differential value is obtained, the device for adjusting optical signals may receive an original input optical signal; and amplify the original input optical signal according to a configured optical signal amplification factor to obtain the input optical signal.

In an embodiment of the present disclosure, the device for adjusting optical signals may further obtain a noise parameter, generate a noise signal corresponding to the noise parameter, and fuse the noise signal with the input optical signal to obtain a fused input optical signal, and then perform a differential operation on the fused input optical signal and the output optical signal to obtain a differential value.

It should be noted that the device for adjusting optical signals may further obtain a configured initial noise parameter before it obtains the noise parameter; and adjust the initial noise parameter by using a noise feedback compensation factor to obtain the noise parameter.

S102: performing a feedforward amplification on the input optical signal by a feedforward amplification circuit to obtain a feedforward value.

In an embodiment of the present disclosure, the device for adjusting optical signals uses the feedforward amplification circuit to carry out a feedforward amplification on the input optical signal, to obtain the feedforward value, and then, the device for adjusting optical signals may use the differential operation circuit to perform a differential operation on the input optical signal and the output optical signal corresponding to the input optical signal, to obtain the differential value. Alternatively, the device for adjusting optical signals may perform a differential operation on the input optical signal and the output optical signal corresponding to the input optical signal by using the differential operation circuit, to obtain the differential value, and then the device for adjusting optical signals may use the feedforward amplification circuit to perform a feedforward amplification on the input optical signal to obtain the feedforward value. Alternatively, the device for adjusting optical signals may use the differential operation circuit to carry out a differential operation on the input optical signal and the output optical signal corresponding to the input optical signal to obtain the differential value, and at the same time it may use the feedforward amplification circuit to carry out a feedforward amplification on the input optical signal to obtain the feedforward value. It may be specifically determined according to the actual situations, while the embodiments of the present disclosure will not pose any limitation.

In an embodiment of the present disclosure, the device for adjusting optical signals comprises a feedforward parameter, and may amplify the input optical signal using the configured feedforward parameter to obtain the feedforward value.

It should be noted that the device for adjusting optical signals may obtain a configured gain correction factor, and then may amplify the input optical signal using the configured feedforward parameters to obtain the feedforward value; determine an input resistance value of the input power detection circuit according to the gain correction factor; and determine an optical signal amplification factor corresponding to the input resistance value according to a preset input resistance value and a preset amplification factor.

S103. Adjusting the output optical signal according to the differential value and the feedforward value to obtain an adjusted output optical signal.

In an embodiment of the present disclosure, after obtaining the differential value and the feedforward value, the device for adjusting optical signals may adjust the output optical signal according to the differential value and the feedforward value, to obtain the adjusted output optical signal.

In an embodiment of the present disclosure, the device for adjusting optical signals also may adjust the differential value to obtain an adjusted differential value; determine a sum of the adjusted differential value and the feedforward value to obtain an adjusted value of the output optical signal; convert the adjusted value of the output optical signal into a voltage signal; output an optical signal matched with the voltage signal, and fuse the optical signal and the output optical signal to obtain the adjusted output optical signal.

It should be understood that when obtaining the input optical signal and the output optical signal corresponding to the input optical signal, the device for adjusting optical signals may directly use the differential operation circuit and the feedforward amplification circuit to obtain the differential value and the feedforward value. In this way, there is no need to separately calculate the differential value between the input optical signal and the output optical signal, whereby the speed at which the device for adjusting optical signals calculates the differential value between the input optical signal and the output optical signal is increased, increasing the speed at which the device for adjusting optical signals adjusts the output optical signal.

An embodiment of the present disclosure provides a storage medium on which one or more programs are stored, wherein the one or more programs may be executed by one or more processors and applied to a device for adjusting an optical signal. The computer program implements the method for adjusting optical signals described in Embodiment 2.

Those skilled in the art should understand that embodiments of the present disclosure may be provided as methods, systems, or computer program products. Therefore, the present disclosure may take the form of hardware embodiments, software embodiments, or embodiments combining software and hardware aspects. Furthermore, the present disclosure may take the form of computer program products implemented on one or more computer available storage media (including but not limited to disk memory, optical memory, etc.) containing computer available program codes.

The present disclosure is described with reference to the flowchart and/or block diagram of the method, the device (system), and the computer program product according to the embodiments of the present invention. It should be understood that each flow and/or block in the flow chart and/or block diagram, and the combinations of flow and/or block in the flow chart and/or block diagram can be realized by computer program instructions. These computer program instructions may be provided to the processors of general-purpose computers, special-purpose computers, embedded processors or other programmable data processing devices so as to generate a machine, so that the instructions executed by the processors of computers or other programmable data processing devices generate devices for realizing the functions specified in one or more processes and/or one or more blocks of a flowchart.

These computer program instructions may also be stored in a computer-readable memory that can guide a computer or any other programmable data processing device to work in a specific way, so that the instructions stored in the computer-readable memory generate a product including an instruction device, wherein the instruction device implements the functions specified in one or more processes and/or one or more blocks of the flowchart.

These computer program instructions may also be loaded onto a computer or any other programmable data processing device to enable a series of operation steps to be performed on the computer or other programmable device to generate computer-realized processing, so that the instructions executed on the computer or other programmable device provide steps for realizing the functions specified in one or more processes and/or one or more blocks of the flowchart.

The above are only preferred embodiments of the present disclosure and are not intended to limit the scope of protection of the present disclosure.

INDUSTRIAL PRACTICABILITY

The embodiments of the present disclosure provide a device, apparatus, method for adjusting optical signals, and a storage medium. According to the implementation scheme of the device for adjusting optical signals, when obtaining the input optical signal and the output optical signal corresponding to the input optical signal, the device for adjusting optical signals may directly use the differential operation circuit and the feedforward amplification circuit to obtain the differential value and feedforward value, and it is no longer necessary to separately calculate the differential value between the input optical signal and the output optical signal, whereby the speed of calculating the feedforward value and the differential value between the input optical signal and the output optical signal by the device for adjusting optical signals is increased, increasing the speed of adjusting the output optical signal by the device for adjusting optical signals.

What is claimed is:

1. A device for adjusting optical signals, comprising a differential operation circuit, a feedforward amplification circuit and a control circuit, wherein input ends of the control circuit are respectively connected with an output end of the differential operation circuit and an output end of the feedforward amplification circuit;
   wherein the differential operation circuit is configured to perform a differential operation on an input optical signal and an output optical signal to obtain a differential value;
   the feedforward amplification circuit is configured to perform a feedforward amplification on the input optical signal to obtain a feedforward value; and
   the control circuit is configured to receive the differential value and the feedforward value, adjust the output optical signal according to the differential value and the feedforward value to obtain an adjusted output optical signal,
   wherein the device further comprises an optical signal input circuit which includes an optical signal input port and an input power detecting circuit;
   wherein an input end of the input power detecting circuit is connected with the optical signal input port, and an output end of the input power detecting circuit is respectively connected with an input end of the feedforward amplification circuit and the output end of the differential operation circuit; and
   the input power detecting circuit is configured to receive an original input optical signal using the optical signal input port, amplify the original input optical signal according to an input resistance value to obtain the input optical signal, and transmit the input optical signal to the feedforward amplification circuit and the differential operation circuit.

2. The device according to claim 1, wherein the feedforward amplification circuit is configured to amplify the input optical signal using a configured feedforward parameter to obtain the feedforward value.

3. The device according to claim 1, wherein the device further comprises a noise compensation circuit and an adder;
   an output end of the noise compensation circuit and an output end of the input power detecting circuit are respectively connected with an input end of the adder;
   an output end of the adder is connected with the input end of the differential operation circuit;
   the noise compensation circuit is configured to generate a noise signal corresponding to a configured noise parameter;
   the adder is configured to receive the noise signal, and fuse the noise signal with the input optical signal to obtain a fused input optical signal.

4. The device according to claim 3, wherein the differential operation circuit is configured to receive the fused input optical signal, and perform a differential operation on the fused input optical signal and the output optical signal to obtain the differential value.

5. The device according to claim 4, wherein the device further comprises an optical signal output circuit which includes an output power detecting circuit and an optical signal output port;
   an input end of the output power detecting circuit is connected with the optical signal output port, and an output end of the output power detecting circuit is connected with an input end of the differential operation circuit;
   the output power detecting circuit is configured to obtain the output optical signal through the optical signal output port, and transmit the output optical signal to the differential operation circuit.

6. The device according to claim 1, wherein the device further comprises an optical signal output circuit which includes an output power detecting circuit and an optical signal output port;
   an input end of the output power detecting circuit is connected with the optical signal output port, and an output end of the output power detecting circuit is connected with an input end of the differential operation circuit;

the output power detecting circuit is configured to obtain the output optical signal through the optical signal output port, and transmit the output optical signal to the differential operation circuit.

7. The device according to claim 6, wherein the control circuit comprises a controller;

input ends of the controller are respectively connected with the output end of the differential operation circuit and the output end of the feedforward amplification circuit;

the controller is configured to adjust the differential value to obtain an adjusted differential value, and determine a sum of the adjusted differential value and the feedforward value to obtain an adjusted value of the output optical signal.

8. The device according to claim 7, wherein the control circuit further comprises a pump circuit and a drive circuit;

an output end of the controller is connected with an input end of the drive circuit; an output end of the drive circuit is connected with an input end of the pump circuit; an output end of the pump circuit is connected with an output end of the optical signal output circuit;

wherein the driving circuit is configured to convert the adjusted value of the output optical signal into a voltage signal; and the pump circuit is configured to receive the voltage signal, output an optical signal matched with the voltage signal, and fuse the optical signal and the output optical signal to obtain the adjusted output optical signal.

9. An apparatus for adjusting optical signals, comprising a light source device, a spectral analysis device, a control device, and a device for adjusting optical signals;

the control device being respectively connected with the light source device and the spectral analysis device; an output end of the light source device being connected with an input end of the device for adjusting optical signals; an output end of the device for adjusting optical signals being connected with an input end of the spectral analysis device;

wherein the device for adjusting optical signals comprises a differential operation circuit, a feedforward amplification circuit and a control circuit, wherein input ends of the control circuit are respectively connected with an output end of the differential operation circuit and an output end of the feedforward amplification circuit; wherein the differential operation circuit is configured to perform a differential operation on an input optical signal and an output optical signal to obtain a differential value; the feedforward amplification circuit is configured to perform a feedforward amplification on the input optical signal to obtain a feedforward value; and the control circuit is configured to receive the differential value and the feedforward value, adjust the output optical signal according to the differential value and the feedforward value to obtain an adjusted output optical signal; wherein the device further comprises an optical signal input circuit which includes an optical signal input port and an input power detecting circuit; wherein an input end of the input power detecting circuit is connected with the optical signal input port, and an output end of the input power detecting circuit is respectively connected with an input end of the feedforward amplification circuit and the output end of the differential operation circuit; and the input power detecting circuit is configured to receive an original input optical signal using the optical signal input port, amplify the original input optical signal according to an input resistance value to obtain the input optical signal, and transmit the input optical signal to the feedforward amplification circuit and the differential operation circuit;

wherein the light source device is configured to receive original parameters sent by the control device and an input power parameter corresponding to the optical signal amplification factor, generate a light source signal corresponding to the input power parameter, and send the light source signal to the apparatus for adjusting optical signal, wherein the original parameters and the input power parameter are parameters of the optical signal adjusting apparatus;

the spectral analysis device is configured to receive the optical signal output by the device for adjusting optical signals, and detect power of the optical signal to obtain first power;

the control device is configured to receive the original parameters and the input power parameter; receive the first power; in a case that the first power meets a preset condition, take the original parameters as configuration parameters; and in a case that the first power does not meet the preset condition, adjust the original parameters until second power corresponding to adjusted original parameters meets the preset condition, and take the adjusted original parameters as the configuration parameters to enable the device for adjusting optical signals to use the configuration parameters to configure the feedforward amplification circuit.

10. The apparatus according to claim 9, wherein the original parameters comprise an original gain correction factor, an original feedforward parameter and an original noise parameter; and the configuration parameters comprise a gain correction factor, a feedforward parameter and a noise parameter.

11. The apparatus according to claim 10, wherein the control device is configured to receive a preset splitting ratio and a preset output resistance value of the device for adjusting optical signals; determine an input resistance value of the device for adjusting optical signals according to the gain correction factor, the preset spectral ratio, the preset output resistance value and the optical signal amplification factor; and transmit the input resistance value to the device for adjusting optical signals.

12. The apparatus according to claim 9, wherein the device for adjusting optical signals further comprises an optical signal input circuit including an optical signal input port and an input power detecting circuit;

wherein an input end of the input power detecting circuit is connected with the optical signal input port, and an output end of the input power detecting circuit is respectively connected with an input end of the feedforward amplification circuit and the output end of the differential operation circuit; and the input power detecting circuit is configured to receive an original input optical signal using the optical signal input port, amplify the original input optical signal according to an input resistance value to obtain the input optical signal, and transmit the input optical signal to the feedforward amplification circuit and the differential operation circuit.

13. The apparatus according to claim 12, wherein the device further comprises a noise compensation circuit and an adder;

an output end of the noise compensation circuit and an output end of the input power detecting circuit are respectively connected with an input end of the adder;

an output end of the adder is connected with the input end of the differential operation circuit;

the noise compensation circuit is configured to generate a noise signal corresponding to a configured noise parameter;

the adder is configured to receive the noise signal, and fuse the noise signal with the input optical signal to obtain a fused input optical signal; and wherein the device for adjusting optical signals uses the configuration parameters to further configure the input power detecting circuit and the noise compensation circuit.

14. A method for adjusting optical signals, which is applied to a device for adjusting an optical signal, wherein the device for adjusting optical signals comprises a differential operation circuit, a feedforward amplification circuit, a control circuit, and an optical signal input circuit which includes an optical signal input port and an input power detecting circuit, wherein an input end of the control circuit is connected with an output end of the differential operation circuit and an output end of the feedforward amplification circuit respectively, and wherein an input end of the input power detecting circuit is connected with the optical signal input port, and an output end of the input power detecting circuit is respectively connected with an input end of the feedforward amplification circuit and the output end of the differential operation circuit, wherein the method comprises:

performing, by the differential operation circuit, a differential operation on an input optical signal and an output optical signal corresponding to the input optical signal to obtain a differential value;

performing, by the feedforward amplification circuit, a feedforward amplification on the input optical signal to obtain a feedforward value;

adjusting the output optical signal according to the differential value and the feedforward value to obtain an adjusted output optical signal, wherein the method further comprises:

receiving, by the input power detecting circuit and using the optical signal input port an original input optical signal, amplifying the original input optical signal according to an input resistance value to obtain the input optical signal, and transmitting the input optical signal to the feedforward amplification circuit and the differential operation circuit.

15. The method according to claim 14, wherein the feedforward amplification circuit comprises a feedforward parameter; and the using the feedforward amplification circuit to perform a feedforward amplification on the input optical signal to obtain a feedforward value comprises:

using the feedforward parameter to amplify the input optical signal to obtain the feedforward value.

\* \* \* \* \*